United States Patent
Dyer et al.

(10) Patent No.: US 6,789,562 B2
(45) Date of Patent: *Sep. 14, 2004

(54) VISCOSITY REGULATING VALVE

(75) Inventors: Gerald P. Dyer, Enfield, CT (US); Richard Hector Bostiga, Ellington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/379,063

(22) Filed: Mar. 4, 2003

(65) Prior Publication Data

US 2003/0155006 A1 Aug. 21, 2003

Related U.S. Application Data

(63) Continuation of application No. 09/875,559, filed on Jun. 6, 2001, now Pat. No. 6,583,525.

(51) Int. Cl.$^7$ .................................................. G05D 7/03
(52) U.S. Cl. ...................... 137/100; 137/339; 137/467.5
(58) Field of Search .......................... 137/98, 100, 339, 137/467.5

(56) References Cited

U.S. PATENT DOCUMENTS

| | | | | |
|---|---|---|---|---|
| 2,107,188 A | * | 2/1938 | Ryder et al. ................. | 137/110 |
| 2,140,735 A | * | 12/1938 | Clarke et al. | |
| 2,349,327 A | * | 5/1944 | Worth ......................... | 137/110 |
| 2,584,877 A | * | 2/1952 | Hoffman et al. ...... | 123/196 AB |
| 3,977,427 A | * | 8/1976 | Reed et al. ................... | 137/13 |
| 4,284,913 A | * | 8/1981 | Barnhardt .................... | 310/54 |
| 4,469,121 A | * | 9/1984 | Moen .......................... | 137/100 |
| 4,653,687 A | * | 3/1987 | Weber ..................... | 137/625.4 |
| 4,982,756 A | * | 1/1991 | Scribner ....................... | 137/13 |
| 5,034,638 A | * | 7/1991 | McCabria .................... | 310/52 |
| 5,749,439 A | * | 5/1998 | Van Maanen .............. | 184/6.12 |
| 5,762,134 A | * | 6/1998 | Droste et al. ............... | 165/284 |
| 6,583,525 B2 | * | 6/2003 | Dyer et al. ................... | 310/53 |

* cited by examiner

*Primary Examiner*—Stephen M. Hepperle
(74) *Attorney, Agent, or Firm*—Carlson, Gaskey & Olds

(57) ABSTRACT

The subject invention is a valve for regulating the viscosity of fluid. The valve includes a housing defining a bore having a first inlet supplying "cold" hydraulic fluid at a first viscosity and a second inlet supplying "hot" hydraulic fluid at a second viscosity. A spool valve disposed within the bore has at least one land to proportionally control the flow of hydraulic fluid through the inlets. Hydraulic fluid from the first and second inlets mixes within the valve and exits the valve through an outlet at an optimum viscosity. A flow restrictor creates a pressure force on the spool valve that is proportional to the viscosity of the hydraulic fluid flowing through the outlet. The pressure force acts to move the spool valve such that the spool valve partially blocks the flow of hydraulic fluid through the first and second inlets, thereby controlling the proportion of "cold" and "hot" fluid to maintain the viscosity of the hydraulic fluid flowing through the outlet.

8 Claims, 3 Drawing Sheets

VISCOSITY REGULATING VALVE

RELATED APPLICATIONS

This application is a continuation of U.S. patent application Ser. No. 09/875,559 filed on Jun. 6, 2001 now U.S. Pat. No 6,583,525.

BACKGROUND OF THE INVENTION

This application discloses a valve assembly for regulating the viscosity of hydraulic fluid entering an integrated drive generator. Integrated drive generators (IDG) are used for generating electrical power on airframes. An IDG functions to produce alternating current at a specific frequency when driven by a variable speed shaft in turn driven by a main propulsion engine. The IDG is a single unit that includes a constant speed drive transmission that converts the variable speed shaft of the power main propulsion engine to a constant speed output that drives the generator. The constant speed drive transmission includes elements that require pressurized oil during the generation of electricity. These elements include a hydraulic pump and motor to provide differential cooling and lubrication for the main generator.

Proper operation of the IDG and the various component parts depends on a stable oil temperature. An increase or decrease in the temperature will change the viscosity of the oil such that the IDG no longer will operate optimally. Typically, hydraulic oil utilized in the IDG is routed through a Fuel Oil cooler that transfers heat from the oil to the fuel used to power the main propulsion engine. This method of cooling the oil is effective. However, the oil temperature and thereby the viscosity of the oil does not remain at a stable temperature which affects the efficient operation of the IDG.

For these reasons there is needed a device or assembly capable of regulating the temperature and thereby the viscosity of the hydraulic oil within an optimal range to ensure the efficient operation of the IDG.

SUMMARY OF INVENTION

The subject invention is a viscosity regulating valve for regulating the viscosity of a hydraulic fluid. The valve includes a housing defining a bore having first and second inlets to supply hydraulic fluid. The hydraulic fluid entering the bore through the first inlet is at a first viscosity and the hydraulic fluid entering the bore through the second inlet is at a second viscosity. As appreciated, viscosity is related to the temperature of the hydraulic fluid and therefore the viscosity of the hydraulic fluid entering through the first inlet is different than the hydraulic fluid entering through the second inlet. A spool valve having at least one land slides within the bore to proportionally block the flow of hydraulic fluid into the bore through the first and second inlets. The hydraulic fluid of differing viscosity and temperatures is mixed within the valve and exits the valve through an outlet at a third viscosity and temperature. The spool valve cooperates with the bore to form an orifice that restricts the flow of hydraulic fluid through the bore and thereby create a force to move the spool valve to proportionally block the flow of hydraulic fluid through the first and second inlets based on the value of the third viscosity and temperature.

The regulating valve of the subject invention provides a simple, precise, compact and cost effective means to regulate the viscosity and temperature of hydraulic fluid.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
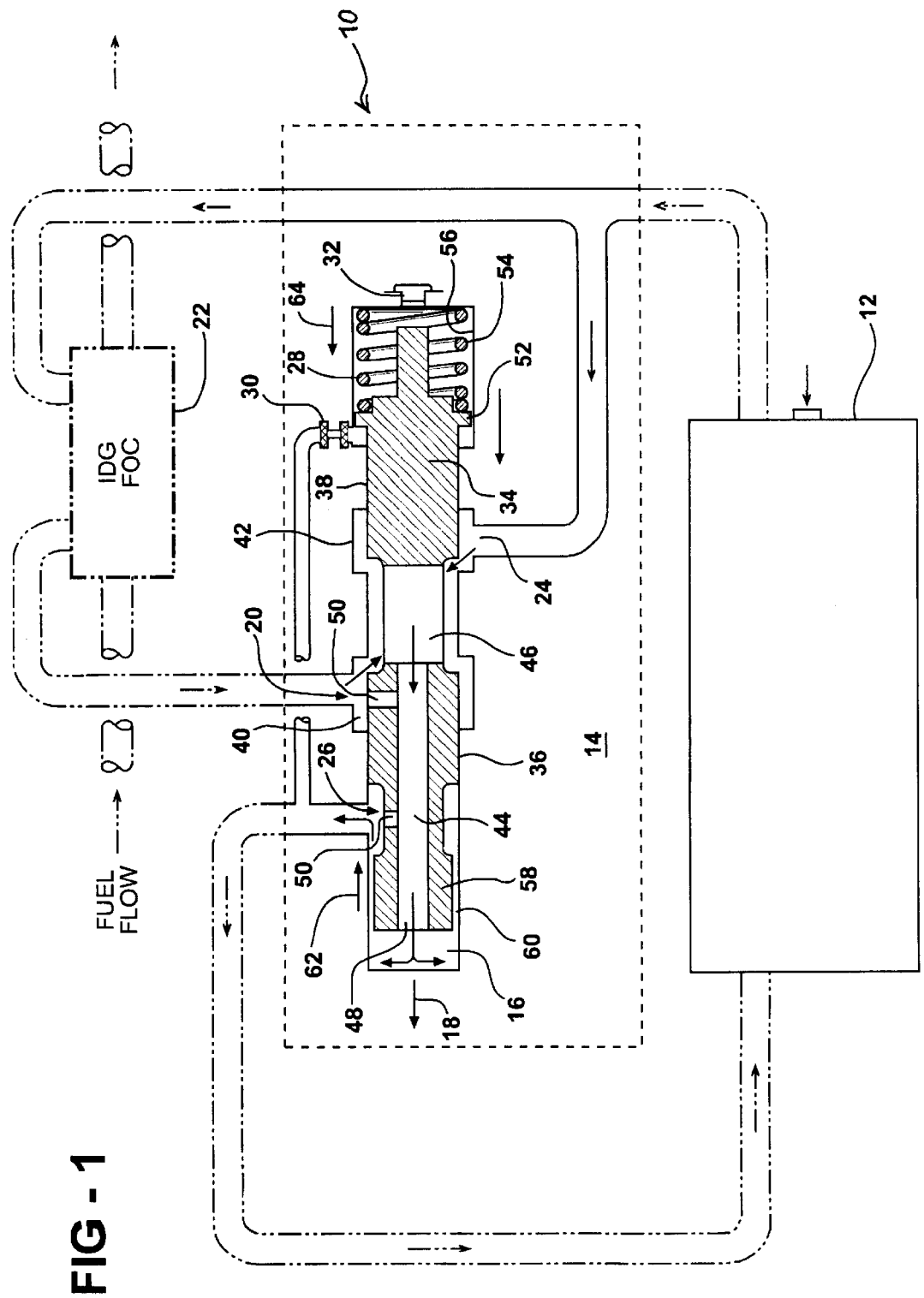
FIG. 1 is a cross-sectional view of the viscosity regulating valve where the spool valve is in a regulating position.

Referring to the Figures, wherein like numerals indicate like or corresponding parts throughout the several views, where the subject invention is a viscosity regulating valve 10 for an integrated drive generator 12. Referring to FIG. 1, the viscosity regulating valve 10 includes a housing 14 that defines a bore 16. The bore 16 is symmetrical about a longitudinal axis 18 and includes a first inlet 20, supplied by hydraulic fluid flowing from a fuel oil cooler 22. "Cold" hydraulic fluid that enters the bore 16 through the first inlet 20 has been routed through the fuel oil cooler 22 to transfer heat away from the hydraulic fluid. A second inlet 24 supplies "hot" hydraulic fluid that has not been routed through the fuel oil cooler 22 and therefore is at a higher temperature. The hydraulic fluid entering through the first inlet 20 is of a lower-temperature and greater viscosity than the hydraulic fluid entering through the second inlet 24. The viscosity of the hydraulic fluid increases as the temperature decreases. The lower the temperature of the hydraulic fluid the greater the viscosity.

An outlet 26 communicates the hydraulic fluid exiting the bore 16 to the IDG 12. The hydraulic fluid flowing out of the bore 16 is at a third viscosity and temperature that is a mixture of the hydraulic fluid entering from the first and second inlets 20, 24. A spring chamber 28 is disposed within the bore 16 opposite the outlet 26. The spring chamber 28 is in fluid communication with the outlet 26 such that the fluid pressure, temperature and viscosity of fluid in the spring chamber 28 are substantially the same as that of fluid at the outlet 26. In the preferred embodiment a damping orifice 30 is disposed between the outlet 26 and the spring chamber 28 to provide for purging of air from the spring chamber 28. Further, the spring chamber 28 includes a test pressure tap 32 that provides a means of testing operation of the viscosity regulating valve 10.

A spool valve 34 disposed within the bore 16 is symmetrical about the longitudinal axis 18. A first land 36 of the spool valve 34 cooperates with the bore 16 to proportionally block the flow of hydraulic fluid entering through the first inlet 20. A second land 38 proportionally blocks the flow of hydraulic fluid through the second inlet 24. The bore 16 includes annular flow windows 40, 42 that allow entering hydraulic fluid to flow around the entire circumference of the spool valve 34.

A passage 44 disposed through the spool valve 34 communicates the flow of hydraulic fluid from the inlets 20, 24 to the outlet 26. The passage 44 provides a path for the hydraulic fluid around the first land 36. Preferably the passage 44 includes at least one opening 46 arranged transverse to the longitudinal axis 18 and disposed near the inlets 20, 24 between the first and second lands 36, 38. Hydraulic fluid entering the bore 16 through the inlets 20, 24 enters the passage 44 through the transverse openings 46 and flows through the spool valve 34 to exit at an exit opening 48. The passage 44 also includes additional minimum flow openings 51 and flow restrictor bypass openings 50 that are disposed adjacent to the first inlet 20 and the outlet 26.

The spool valve 34 includes a spring support shoulder 52 that is disposed within the spring chamber 28. A spring 54 is compressed between the shoulder 52 and a wall 56 of the spring chamber 28. The spring 54 biases the spool valve 34 to a position such that the second inlet 24 is substantially blocked and the first inlet 20 is substantially open. A restriction land 58 of the spool valve 34 is disposed opposite the spring chamber 28. The restriction land 58 cooperates with the bore 16 to create a flow restrictor 60. Preferably the flow restrictor 60 is annularly shaped and provides for laminar flow of the hydraulic fluid. Hydraulic fluid flow through the flow restrictor 60 creates a pressure drop directly proportional to the viscosity of the hydraulic fluid. The pressure drop creates a pressure force indicated by arrow 62 opposing the spring force indicated by arrow 64 that positions the spool valve 64 and thereby the first and second lands 36, 38 to proportionally block the inlets 20, 24.

In operation, the pressure force 62 created by the pressure drop through the flow restrictor 60 is proportional to the viscosity and temperature of the hydraulic fluid. As appreciated, the cooler the temperature of the fluid, the higher the viscosity and the greater the pressure drop. The higher the pressure drop through the flow restrictor 60, the greater the pressure force 62 relative to the spring force 64, thereby moving the spool valve 34 to proportionally close the inlets 20, 24 and adjust the mixture of the hydraulic oil exiting the outlet 26. FIG. 1 shows the spool valve 34 in the regulating position where the viscosity and temperature of the hydraulic fluid is substantially within a desired range for optimal efficiency of the IDG 12. In this position "hot" fluid from the second inlet 24 is mixed with "cold" fluid from the first inlet 20 to obtain the desired temperature and viscosity exiting through the outlet to the IDG 12.

Figure 2:
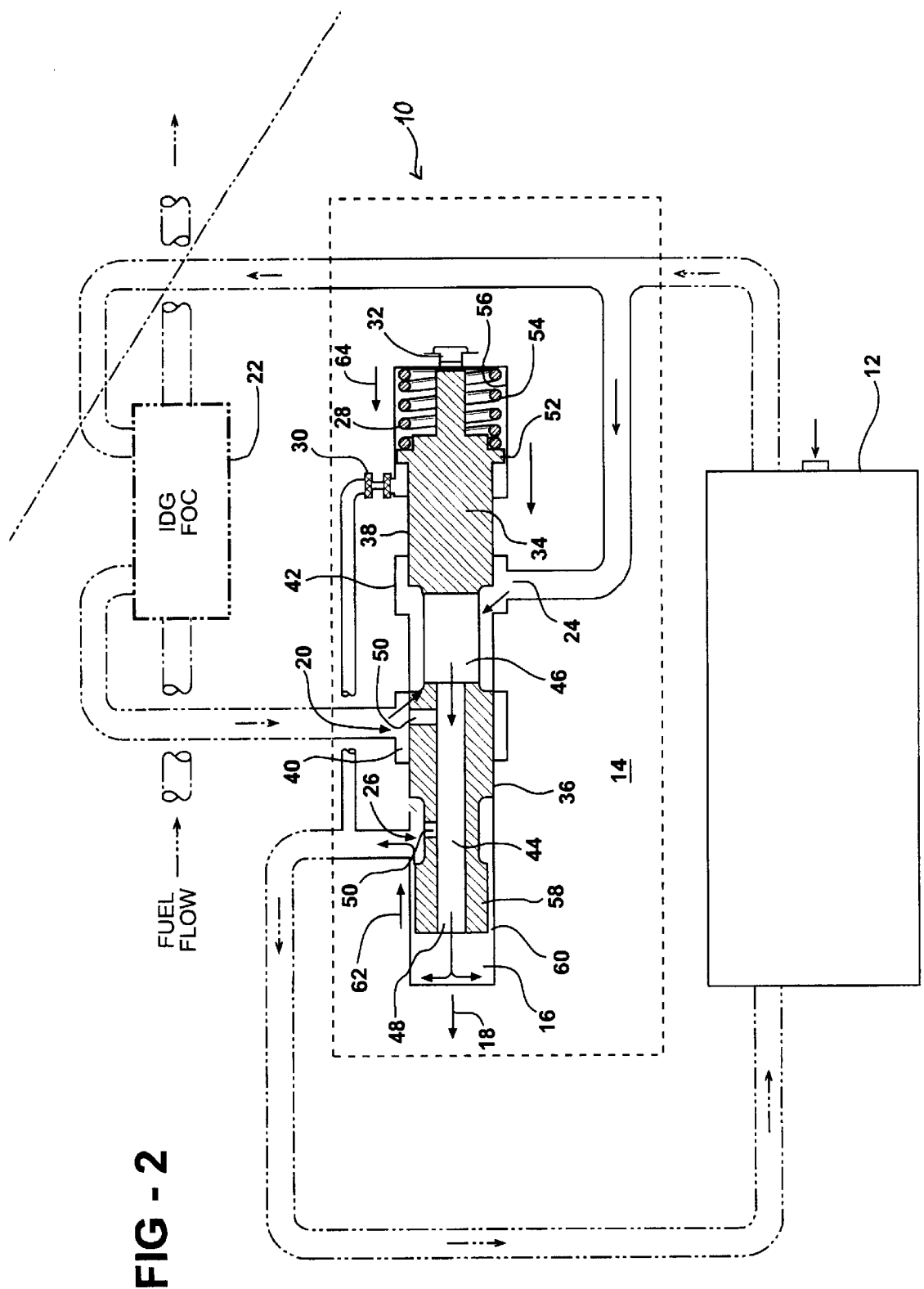
FIG. 2 a cross-sectional view of the viscosity regulating valve with the spool valve blocking the first inlet.

Referring to FIG. 2, the spool valve 34 is shown in the cold fluid position where the flow from the first inlet 20 is blocked and flow from the second inlet 24 is open. This position is typical during starting conditions were fluid has not yet been heated. As shown, fluid from the first inlet 20 that has not been cooled freely enters the bore 16 and proceeds through the passage 44 and flow restrictor 60. Note that flow entering through the first inlet 20 is not completely blocked because of a minimum flow opening 51. The minimum flow opening 51 allows a minimum flow from the IDG FOC 22 at all times, such that the IDG 12 is always supplied with hydraulic fluid. A flow restrictor by pass opening 50 allows flow to the IDG 12 independent of the flow restrictor 60. The total amount of flow of hydraulic fluid to the IDG 12 is the cumulative flow through the flow restrictor by pass opening 50 and flow through the flow restrictor 60. As appreciated the flow regulated by the flow restrictor 60 is sufficient to provide for the balancing of the spool valve 34 based on the viscosity and temperature of the hydraulic fluid exiting the bore 16 through the outlet 26.

Figure 3:
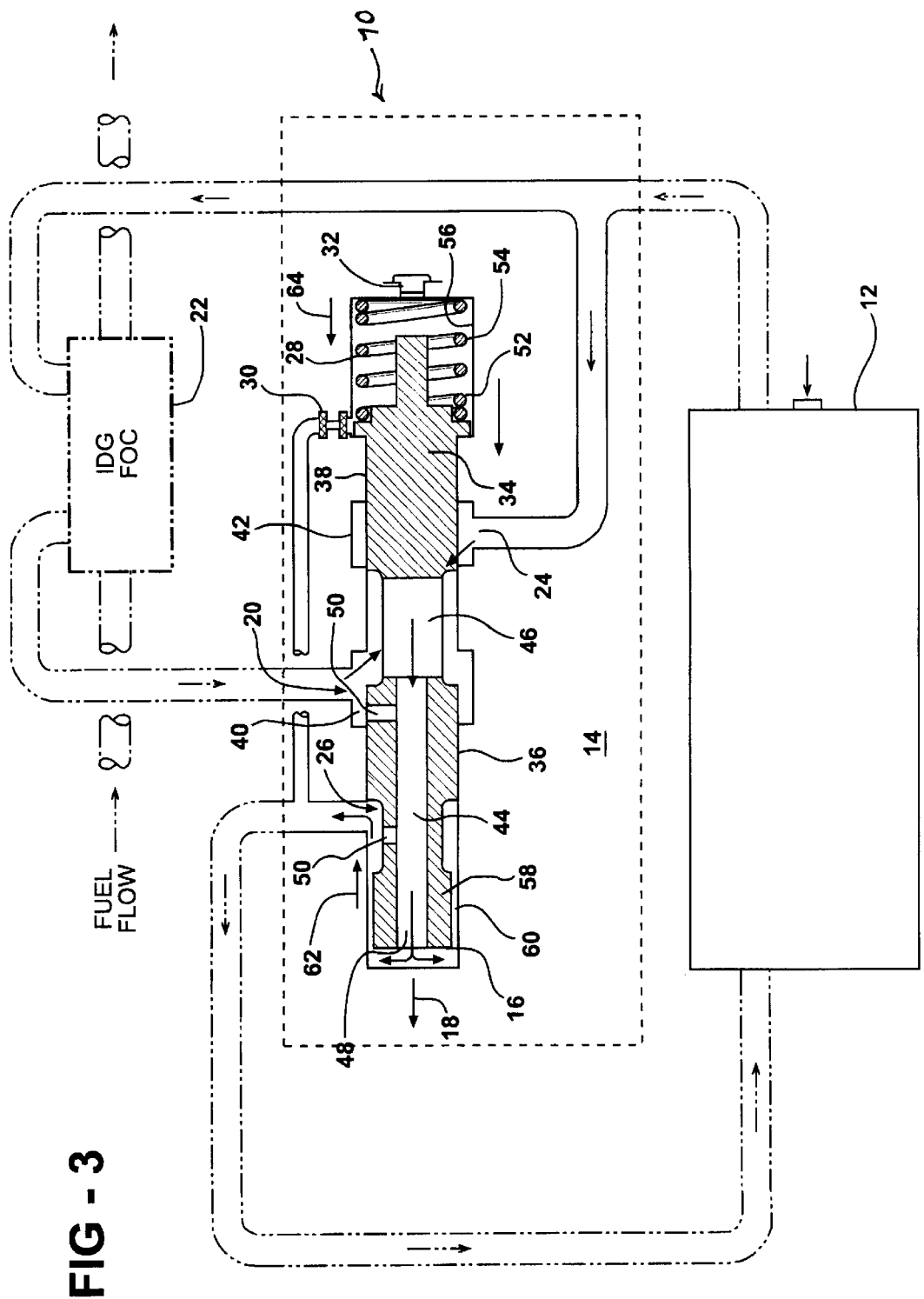
FIG. 3 is a cross-sectional view of the viscosity regulating valve with the spool valve blocking the second inlet.

Referring to FIG. 3, the spool valve 34 is shown in a "hot" fluid position where flow from the second inlet 24 is substantially blocked and flow through the first inlet 20 is substantially open. This position reflects the condition where the hydraulic fluid exiting the outlet 26 is at a higher temperature and lower viscosity than required for the optimum operation of the IDG 12. In this position the flow of hydraulic fluid through the flow restrictor 60 creates a relatively low pressure drop and thereby a relatively low pressure force 62 to counteract the spring force 64, causing the spool valve 34 to close off the second inlet 24 that provides "hot" hydraulic fluid and opening the first inlet 20 in order to provide more "cold" fluid.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A valve assembly for regulating oil temperature and viscosity of a fluid comprising:

a housing defining a bore;

a first inlet supplying fluid at a first temperature to said bore;

a second inlet supplying fluid at a second temperature to said bore;

a spool valve disposed within said bore and having at least one land disposed to proportionally block the flow of fluid through said inlets; and an outlet through which fluid exits said bore at a third temperature, wherein said spool valve includes a restriction land that cooperates with said bore to form said flow restrictor.

2. The assembly of claim 1, wherein said spool valve includes second and third lands, said second land disposed to proportionally block the flow of fluid through said first inlet and said third land disposed to proportionally block the flow of hydraulic fluid through said second inlet.

3. The assembly of claim 1, wherein said bore includes a spring chamber and a spring disposed in said spring chamber biasing said spool valve against a force created by the flow of fluid through said flow restrictor.

4. The assembly of claim 3, wherein said spring chamber is in fluid communication with said outlet, such that pressure in said spring chamber is substantially equal to pressure at said outlet.

5. A valve assembly for regulating oil temperature and viscosity of a fluid comprising:

a housing defining a bore;

a first inlet supplying fluid at a first temperature to said bore;

a second inlet supplying fluid at a second temperature to said bore;

a spool valve disposed within said bore and having at least one land disposed to proportionally block the flow of fluid through said inlets, wherein said spool valve includes a fluid passage that substantially all fluid entering said bore flows through; and an outlet through which fluid exits said bore at a third temperature.

6. The assembly of claim 5, wherein said fluid passage includes a first portion extending through said spool valve transverse to said bore and a second portion extending longitudinally from said first portion to one end of said spool valve.

7. The assembly of claim 1, wherein said first temperature is lower than said second temperature.

8. A valve assembly for regulating oil temperature and viscosity of a fluid comprising:

a housing defining a bore;

a first inlet supplying fluid at a first temperature to said bore;

a second inlet supplying fluid at a second temperature to said bore;

a spool valve disposed within said bore and having at least one land disposed to proportionally block the flow of fluid through said inlets, and an outlet through which fluid exits said bore at a third temperature, wherein said first inlet supplies fluid that has flowed through a cooling unit and said second inlet supplies fluid not flowed through the cooling unit.

* * * * *